United States Patent
Lee et al.

(10) Patent No.: US 9,889,703 B2
(45) Date of Patent: Feb. 13, 2018

(54) TIRE WITH SPLICED FILM INNERLINER

(71) Applicant: The Goodyear Tire & Rubber Company, Akron, OH (US)

(72) Inventors: Byoung Jo Lee, Copley, OH (US); Philip Alan Dunker, Stow, OH (US); Joshua Aaron Phillipson, Brecksville, OH (US); John Fleming Brainerd, II, Medina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 395 days.

(21) Appl. No.: 14/571,648

(22) Filed: Dec. 16, 2014

(65) Prior Publication Data

US 2016/0167433 A1    Jun. 16, 2016

(51) Int. Cl.
| | |
|---|---|
| *B60C 1/00* | (2006.01) |
| *B29D 30/20* | (2006.01) |
| *B60C 5/14* | (2006.01) |
| *B60C 9/04* | (2006.01) |
| *B29D 30/06* | (2006.01) |
| *B29D 30/42* | (2006.01) |

(52) U.S. Cl.
CPC ............ *B60C 1/0008* (2013.01); *B29D 30/20* (2013.01); *B29D 2030/0682* (2013.01); *B29D 2030/421* (2013.01); *B29D 2030/423* (2013.01); *B60C 5/14* (2013.01); *B60C 2005/147* (2013.01); *B60C 2009/0408* (2013.01)

(58) Field of Classification Search
CPC ... B60C 1/0008; B60C 5/14; B60C 2005/147; B60C 2009/0408; Y10T 15/10855; B29D 2030/0682; B29D 2030/421; B29D 2030/423

USPC .................................................. 152/510, 548
See application file for complete search history.

(56) References Cited

U.S. PATENT DOCUMENTS

| | | | |
|---|---|---|---|
| 4,928,741 A | 5/1990 | Rye | |
| 5,040,583 A | 8/1991 | Lin | |
| 5,437,751 A * | 8/1995 | Hirano | ................... B29D 30/42 |
| | | | 152/548 |
| 5,938,869 A * | 8/1999 | Kaido | ................ B29D 30/0681 |
| | | | 152/510 |
| 6,359,071 B1 | 3/2002 | Watanabe et al. | |
| 6,376,598 B1 | 4/2002 | Wang | |
| 6,843,292 B2 | 1/2005 | Wang | |
| 6,861,470 B2 | 3/2005 | Watanabe | |
| 7,414,094 B2 * | 8/2008 | Miyazaki | .............. B60C 1/0008 |
| | | | 152/511 |
| 8,454,778 B2 * | 6/2013 | Majumdar | ............ B60C 1/0008 |
| | | | 152/510 |
| 8,544,517 B2 | 10/2013 | Hong et al. | |
| 2001/0041762 A1 | 11/2001 | Ikawa et al. | |
| 2010/0193098 A1 * | 8/2010 | Kirino | ..................... C08L 15/00 |
| | | | 152/450 |
| 2013/0101821 A1 | 4/2013 | Jeon et al. | |

(Continued)

FOREIGN PATENT DOCUMENTS

| | | |
|---|---|---|
| EP | 0706878 A2 | 4/1996 |
| EP | 0722850 A1 | 7/1996 |

(Continued)

*Primary Examiner* — Seyed Masoud Malekzadeh (74) *Attorney, Agent, or Firm* — Henry C. Young, Jr.

(57) ABSTRACT

The present invention relates to a pneumatic tire having an alloy film innerliner with a rubber reinforced spliced overlapping ends.

3 Claims, 5 Drawing Sheets

(56) References Cited

U.S. PATENT DOCUMENTS

| | | |
|---|---|---|
| 2013/0192736 A1 | 8/2013 | Song et al. |
| 2013/0199686 A1 | 8/2013 | Chung et al. |
| 2014/0227499 A1 | 8/2014 | Kwon et al. |
| 2014/0242370 A1 | 8/2014 | Song et al. |

FOREIGN PATENT DOCUMENTS

| | | |
|---|---|---|
| EP | 1726620 A1 | 11/2006 |
| EP | 1880871 A1 | 1/2008 |
| WO | 2007050061 A1 | 5/2007 |
| WO | 2007050236 A1 | 5/2007 |
| WO | 2007070728 | 6/2007 |
| WO | 2007111584 | 10/2007 |
| WO | 2008051253 | 5/2008 |

* cited by examiner

FIG-2

TIRE WITH SPLICED FILM INNERLINER

FIELD OF THE INVENTION

The present invention relates to a pneumatic tire having a film innerliner with rubber reinforced spliced overlapping ends.

BACKGROUND OF THE INVENTION

Pneumatic tires usually contain innerliner layers to retard permeation of air from the tire's cavity into the tire carcass. Such innerliner, or barrier, layers are usually in a form of layers comprised of butyl rubber or halogenated butyl rubber (sometimes referred to as halobutyl rubber) based rubber compositions which provide resistance to permeability of air.

To adequately promote resistance to air permeability, such innerliner is typically provided as a sufficiently thick layer which, in turn, may add significant weight to the tire.

Accordingly, various alternative thin air permeability resistant films have been proposed for pneumatic tire innerliners which are significantly lighter in weight. For example, and not intended to be limiting, see U.S. Pat. Nos. 4,928,741, 5,040,583, 5,938,869, 6,359,071, 6,376,598, 6,843,292, 6,861,470 and 8,544,517; U.S. Patent Publication Nos. 2001/0041762, 2013/0101821, 2013/0192736, 2013/0199686, 2014/0227499 and 2014/0242370; PCT Patent Publication Nos. WO/2006/1211140, WO/2007/050061, WO/2007/050236, WO/2007/070728, WO/2007/111584, WO/2008/051253, and European Patent Publication Nos. EP 0706878, EP 0722850, EP 1726620 and EP 1880871.

Various thin films of various polymers have been proposed for a tire innerliner layer comprised of, for example, a combination of thermoplastic resin which may contain a blend or dispersion of various polymers or copolymers.

The such films may be provided, for example, with a coating on one or both sides with an RFL (resorcinol/formaldehyde latex based) adhesive to promote adhering of overlapping ends of the sheet together, particularly where the sheet is placed on the circumferential inner surface of the tire.

For this invention, is desired to provide a pneumatic tire having an innerliner comprised of an innerliner film having an inner surface covering the tire carcass's surface in a circumferential direction and an outer surface adjacent to an internal air cavity of said tire, wherein the innerliner film has its two end portions overlapping each other to form a splice comprised of an inner first end portion adjacent to the tire rubber carcass and an outer second end portion adjacent to the internal air cavity of the pneumatic tire.

To enable and promote a durable splice for the innerliner film, it is proposed that the innerliner splice is comprised of:

(A) the overlapping inner first and outer second end portions of said innerliner film bonded through a first rubber strip positioned therebetween, wherein said first rubber strip extends in a circumferential direction beyond said splice on the inner surface of the innerliner film to further bond a combination of a surface of said inner end portion of the innerliner film, said inner surface of the innerliner film and said tire rubber carcass, and (B) a second rubber strip abridging and bonded to the a surface of said outer second end portion of the innerliner film and outer surface of said innerliner film adjacent to the internal air cavity of said pneumatic tire.

SUMMARY AND PRACTICE OF THE INVENTION

In accordance with this invention, a pneumatic tire is provided having an innerliner comprised of an innerliner film having an inner surface covering the tire carcass's inner surface in a circumferential direction and having an outer surface adjacent to an internal air cavity of said tire;

wherein the innerliner film has its two end portions overlapping each other to form a splice comprised of an inner first end portion adjacent to the tire rubber carcass and an outer second end portion adjacent to the internal air cavity of the pneumatic tire;

wherein said innerliner film splice is comprised of:

(A) the overlapping inner first and outer second end portions of said innerliner film bonded through a first rubber strip positioned therebetween, wherein said first rubber strip extends circumferentially beyond said splice on the inner surface of the innerliner film to further bond a combination of a surface of said inner end portion of the innerliner film, said inner surface of the innerliner film and said tire rubber carcass, and (B) a second rubber strip abridging and bonded to the a surface of said outer second end portion of the innerliner film and outer surface of said innerliner film adjacent to the internal air cavity of said pneumatic tire;

wherein said innerliner film is comprised of from about 40 to about 85 weight percent of a thermoplastic polyamide-based polymer (or resin), which may be comprised of, for example, a copolymer of a diamine and dicarboxylic acid and from about 15 to about 60 weight percent of dispersed domains therein comprised of at least one of:

(C) copolymer or mixture comprised of a polyamide-based segment and a polyether-based segment, and (D) polymer comprised of at least one of polyalkylene glycol (e.g. at least one of polyethyleneglycol, polypropyleneglycol and polytetramethylene glycol), polyoxyalkylene diamine (e.g. at least one of polyoxyethylene diamine, polyoxypropylene diamine and polyoxytetramethylene diamine) and copolymers thereof.

In practice, the first and second rubber strips are comprised of at least one sulfur curable diene-based elastomer comprised of at least one polymer at least one of isoprene and 1,3-butadiene and of styrene with at least one of isoprene and 1,3-butadiene, wherein said elastomer is exclusive of a copolymer of isobutylene and diene hydrocarbon. While the width of the rubber strip may extend any desirable and suitable length beyond said splice (e.g. in a circumferential direction beyond said splice) it may generally extend a distance, for example, of form about 2 to about 10 cm.

It is an important aspect of the invention that the location of the innerliner film splice is spaced apart from any tire rubber carcass ply splice to thereby promote a better weight balance and associated integrity of the tire.

In practice, the innerliner film may be comprised of from one to three wraps (e.g. one to three film layers) around the circumference of the tire rubber carcass within the pneumatic tire's inner cavity, usually one wrap (one film layer).

In practice, the innerliner film may be optionally coated on both of its sides with an RFL adhesive to provide building tack between the innerliner film and uncured tire rubber carcass and to be thereby cohesively adhered, or bonded, by the RFL adhesive to the tire rubber carcass. Such tire rubber carcass is generally comprised of a sulfur curable diene-based elastomer comprised of at least one polymer of at least one of isoprene and of 1,3-butadiene and of styrene with at least one of isoprene and 1,3-butadiene, wherein said elastomer is desirably exclusive of a copolymer of isobutylene and diene hydrocarbon.

As indicated, the innerliner film is comprised of a copolymer of diamine and dicarboxylic acid representative of which are at least one of nylon 6, nylon 6-6, nylon 4,6, nylon 11, nylon 12, nylon 6,10 and nylon 6,12 wherein at least one of nylon 6 and nylon 6-6 may be most desirable.

A representative of tire innerliner films, in general and not intended to be limitative, may be found, for example, in U.S. Pat. No. 8,544,517 and U.S. Patent Publication Nos. 2013/0101821, 2013/0199686 and 2014/0227499 which are referenced and included herein in their entirety.

Nylon is a generic designation for a family of synthetic thermoplastic polymers generally known as aliphatic polyamides as copolymers of a diamine and dicarboxylic acid. They are, generally, polymers composed of repeating units linked by amide bonds which are frequently referred to as being polyamides. Nylons are condensation polymers formed by reacting relatively equal parts of a diamine with a dicarboxylic acid. Amides are usually formed at both ends of each monomer. Chemical elements of the nylons include carbon, hydrogen, nitrogen and oxygen. For example, nylon 6 is reported as being a polycaprolactam having a melting point of about 220° C. Nylon 6-6 is reported as being a polymer of hexamethylenediamine (a 6 carbon diamine) and adipic acid (e.g. polyhexamethylene adipamide) having a melting point of about 265° C. Nylon 6,12 is reported as being a copolymer of a 6 carbon diamine and 12 carbon dicarboxylic acid.

In one embodiment, and as previously indicated, both sides of the innerliner film may contain an RFL adhesive coating to promote bonding of the innerliner film to the adjoining carcass ply as well as promoting bonding of the components of the innerliner film splice (e.g. the innerliner film end segments and rubber strips. Such RFL coating is typically comprised of a resorcinol-formaldehyde resin/styrene-butadiene vinylpyridine latex optionally containing a styrene-butadiene rubber latex, and optionally containing a blocked isocyanate.

In additional accordance with this invention, the tire is provided as a cured rubber tire (e.g. a sulfur cured rubber tire) with the innerliner splice and rubber strip reinforcement being bonded together (e.g. cohesively bonded building tack to thereby bond them together until the tire is cured) by said RFL adhesive.

In further accordance with this invention, a method of preparing a pneumatic tire comprises:

(A) applying a rubber strip (referred to herein as a second rubber strip) onto and in line with the axis of a cylindrical tire building drum, (B) applying and adhering a first end portion of a tire innerliner film, containing first and second end portions thereof, onto said second rubber strip on said tire building drum, wherein said second rubber strip extends the width (the axial width) of the innerliner film, (C) applying a rubber strip (referred to herein as a first rubber strip) onto said first end portion of said innerliner film in line with and opposite to said second rubber strip and on an opposite side of the first end portion of the innerliner film, wherein the first rubber strip extends the width (the axial width) of the innerliner film, (D) wrapping said sheet of innerliner film in a circumferential direction around said cylindrical tire building drum to align a second end portion of the innerliner film in an overlapping relationship with said first rubber strip therebetween to form an innerliner splice, (E) building a tire carcass rubber ply in a circumferential direction around and onto said innerliner film splice with the ends of the carcass rubber ply overlapping each other to form a carcass ply splice positioned at a location spaced apart from the location of the innerliner film splice followed by building the remainder of the tire components over the carcass ply to form a pneumatic tire having an internal air cavity;

wherein said first rubber strip extends in a circumferential direction beyond said innerliner splice on the surface of the innerliner film to further bond a combination of a surface of said inner end portion of the innerliner film, said innerliner film and said tire rubber carcass;

wherein said second rubber strip abridges and is bonded to said outer second end portion of the innerliner film and said innerliner film adjacent to the internal air cavity of said pneumatic tire;

wherein said innerliner film is comprised of from about 40 to about 85 weight percent of a thermoplastic polyamide-based polymer (or resin), which may be, for example, a copolymer of diamine and dicarboxylic acid and from about 15 to about 60 weight percent of dispersed domains therein comprised of at least one of:

(F) copolymer or mixture comprised of a polyamide-based segment and a polyether-based segment of elastomer, and (G) polymer comprised of at least one of polyalkylene glycol (e.g. at least one of polyethyleneglycol, polypropyleneglycol and polytetramethylene glycol), polyoxyalkylene diamine (e.g. at least one of polyoxyethylene diamine, polyoxypropylene diamine and polyoxytetramethylene diamine) and copolymers thereof.

As previously indicated, representative of said copolymers of diamine and dicarboxylic acid for said film innerliner are at least one of nylon 6, nylon 6-6, nylon 46, nylon 11, nylon 12, nylon 6,10 and nylon 6,12 wherein at least one of nylon 6 and nylon 6-6 may be desirable.

In one embodiment of said method, as previously indicated, both sides of the innerliner film are coated with an RFL adhesive coating to promote bonding (e.g. cohesive bonding building tack until the tire is cured) of the innerliner film to the adjoining rubber carcass ply and to promote bonding (e.g. cohesive bonding building tack until the tire is cured) of the components of the innerliner film splice together (e.g. the innerliner film end segments and rubber strips).

The method further comprises curing (sulfur curing) the tire in a suitable mold at an elevated temperature (e.g. about 160° C. to about 170° C.) to thereby provide a cured rubber tire.

As previously indicated, the RFL adhesive is a well known resorcinol-formaldehyde resin/butadiene-styrene-vinyl pyridine terpolymer latex, or a blend thereof with a butadiene/styrene rubber latex, used in the tire industry for application to fabrics, fibers and textile cords for aiding in their adherence to rubber components (for example, see U.S. Pat. No. 4,356,219).

In one embodiment, the film is treated, namely coated, with an aqueous RFL emulsion comprised of combination or resorcinol-formaldehyde resin, and one or more indicated elastomer latexes, and the coating dried to remove water.

In one embodiment, the RFL for said coating may include the resorcinol formaldehyde resin, a styrene-butadiene copolymer latex and vinylpyridine-styrene-butadiene terpolymer latex. In a further embodiment, the RFL may also include a blocked isocyanate.

In one embodiment, the RFL adhesive composition is comprised of
(A) resorcinol,
(B) formaldehyde,
(C) a styrene-butadiene rubber latex,
(D) a vinylpyridine-styrene-butadiene terpolymer latex, and, optionally,
(E) a blocked isocyanate.

The resorcinol reacts with formaldehyde to produce a resorcinol-formaldehyde reaction product. This reaction product is the result of a condensation reaction between a phenol group on the resorcinol and the aldehyde group on the formaldehyde. Resorcinol resoles and resorcinol-phenol resoles, whether formed in situ within the latex or formed separately in aqueous solution, are considerably superior to other condensation products in the adhesive mixture.

For preparation of an RFL adhesive, for example, the resorcinol may be dissolved in water to which formaldehyde has been added (for example, about 37 percent formaldehyde) together with a strong base such as sodium hydroxide. The strong base should generally constitute around 7.5 percent or less of the resorcinol, and the molar ratio of the formaldehyde to resorcinol should be in a range of from about 1.5 to about 2. The aqueous solution of the resole or condensation product or resin is mixed with the styrene-butadiene latex and vinylpyridine-styrene-butadiene terpolymer latex. The resole or other mentioned condensation product or materials that form said condensation product should, for example, constitute from 5 to 40 parts and more desirably about 10 to about 28 parts by weight solids of the latex mixture. The condensation product forming the resole or resole type resin forming materials should desirably be partially reacted or reacted so as to be only partially soluble in water. Sufficient water is then preferably added to give around 12 percent to 28 percent by weight overall solids in the final mixture. The weight ratio of the polymeric solids from the latex to the resorcinol/formaldehyde resin should, for example, be in a range of about 2/1 to about 6/1.

In one embodiment, the RFL adhesive may include a blocked isocyanate. For example, about 1 to about 8 parts by weight of solids of a blocked isocyanate is added to the adhesive. The blocked isocyanate may be any suitable blocked isocyanate known to be used in RFL adhesive dips including, but not limited to, caprolactam blocked methylene-bis-(4-phenylisocyanate), such as Grilbond-IL6 available from EMS American Grilon, Inc., and phenol formaldehyde blocked isocyanates as disclosed in U.S. Pat. Nos. 3,226,276; 3,268,467; and 3,298,984; the three of which are fully incorporated herein by reference. As a blocked isocyanate, use may be made of reaction products between one or more isocyanates and one or more kinds of isocyanate blocking agents. The isocyanates include monoisocyanates such as phenyl isocyanate, dichlorophenyl isocyanate and naphthalene monoisocyanate, diisocyanate such as tolylene diisocyanate, dianisidine diisocyanate, hexamethylene diisocyanate, m-phenylene diisocyanate, tetramethylene diisocynate, alkylbenzene diisocyanate, m-xylene diisocyanate, cyclohexylmethane diisocyanate, 3,3-dimethoxyphenylmethane-4,4'-diisocyanate, 1-alkoxybenzene-2,4-diisocyanate, ethylene diisocyanate, propylene diisocyanate, cyclohexylene-1,2-diisocyanate, diphenylene diisocyanate, butylene-1,2-diisocyanate, diphenylmethane-4,4diisocyanate, diphenylethane diisocyanate, 1,5-naphthalene diisocyanate, etc., and triisocyanates such as triphenylmethane triisocyanate, diphenylmethane triisocyanate, etc. The isocyanate-blocking agents include phenols such as phenol, cresol, and resorcinol, tertiary alcohols such as t-butanol and t-pentanol, aromatic amines such as diphenylamine, diphenylnaphthylamine and xylidine, ethyleneimines such as ethylene imine and propyleneimine, imides such as succinic acid imide, and phthalimide, lactams such as epsilon-caprolactam, delta-valerolactam, and butyrolactam, ureas such as urea and diethylene urea, oximes such as acetoxime, cyclohexanoxime, benzophenon oxime, and alpha-pyrolidon.

The polymers of the RFL adhesive composition may be applied in a form of an aqueous latex or otherwise, usually in a form of a latex. In one embodiment, for example, a vinylpyridine-styrene-butadiene terpolymer latex and styrene-butadiene rubber latex may be added to the RFL adhesive composition. The vinylpyridine-styrene-butadiene terpolymer may be present in the RFL adhesive such that the solids weight of the vinylpyridine-styrene-butadiene terpolymer is from about 50 percent to about 100 percent of the solids weight of the styrene-butadiene rubber; in other words, the weight ratio of vinylpyridine-styrene-butadiene terpolymer to styrene-butadiene rubber is from about 1/1 to about 2/1.

In further accordance with this invention, said tire assembly is provided as a sulfur vulcanized composite and thereby a cured rubber tire. Such vulcanization may be conducted, for example, under conditions of elevated temperature and pressure as would be well known to those having skill in such art of rubber vulcanization.

Representative of sulfur vulcanizable elastomers of said tire carcass to which said RFL adhesive is in contact may be comprised of, for example, cis 1,4-polyisoprene, cis 1,4-polybutadiene and styrene/butadiene copolymer rubbers.

BRIEF DESCRIPTION OF THE DRAWINGS

The figures (FIG's) contained in the accompanying drawings are presented to illustrate a tire with several embodiments of an innerliner film covering a tire carcass's inner surface in a circumferential direction, wherein the innerliner film has its two end portions overlapping each other to form a splice with a rubber strip therebetween.

THE DRAWINGS

Figure 1:
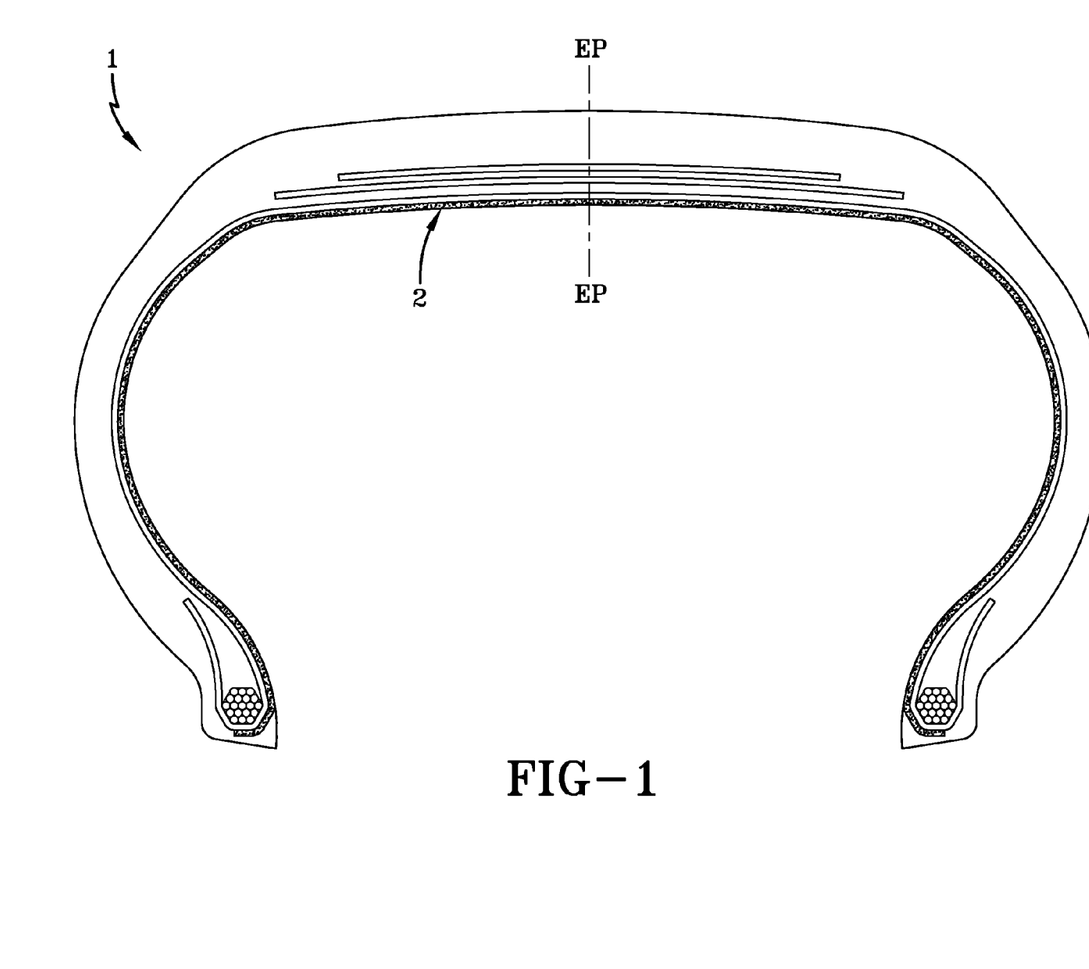
FIG. 1 illustrates a cross-sectional view of a pneumatic tire containing innerliner film.

FIG. 1 illustrates a cross-sectional view of a pneumatic tire (1) containing an innerliner film (2). The indicated "EP" represents a center line of the tire (1).

Figure 2:
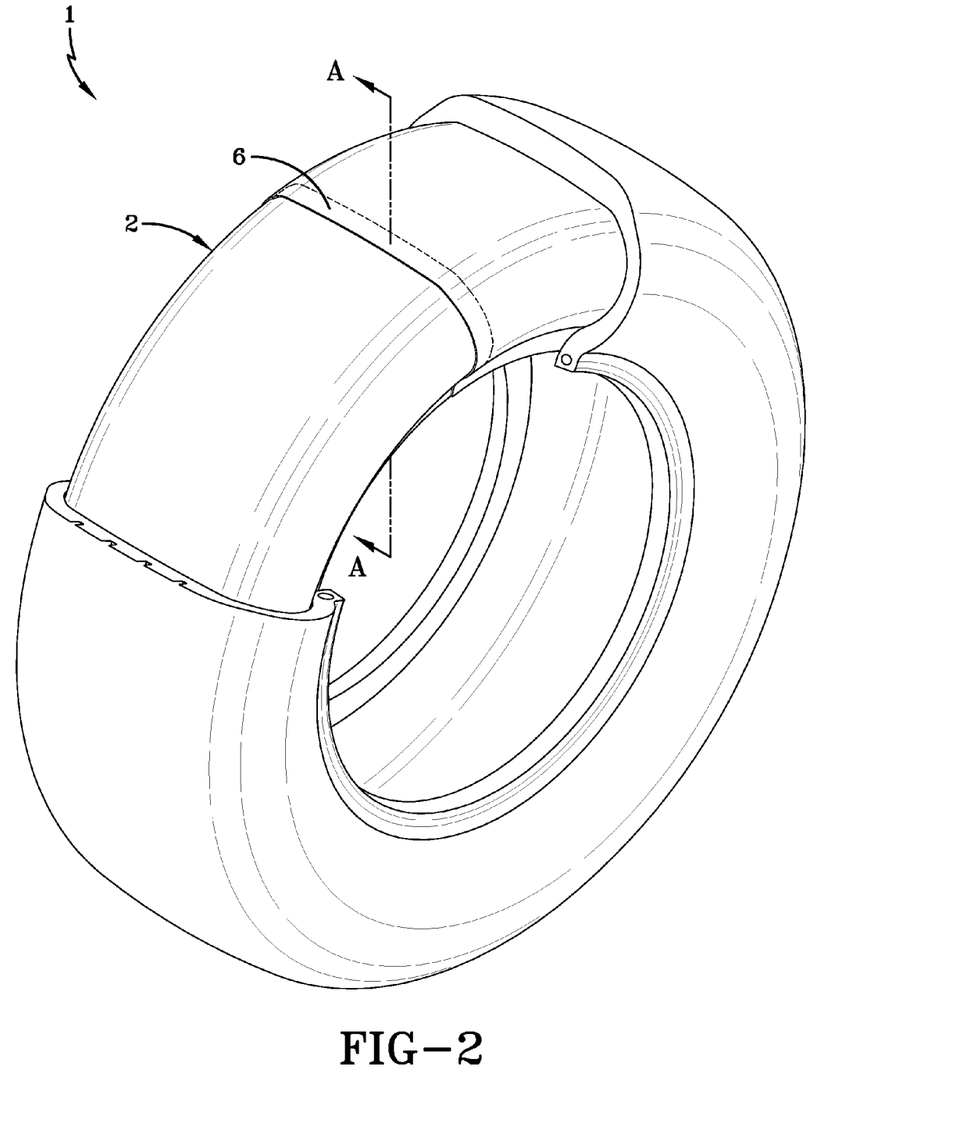
FIG. 2 is a prospective view of the tire illustrating a circumferential sheet of spliced innerliner film with a rubber strip between the ends of the innerliner film.

FIG. 2 is a perspective view of the tire (1) illustrating a circumferential sheet of innerliner film (2) having its end portions overlapped to form a splice (6). The ends of the innerliner film (2) become spliced upon being wrapped around a cylindrical tire building drum with a rubber strip therebetween.

Figure 3:
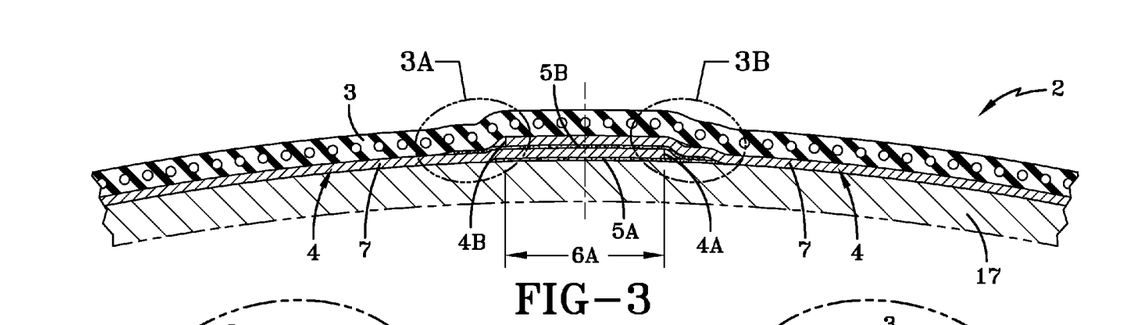
FIG. 3 is an enlarged cross sectional view taken long lines A-A of FIG. 2 illustrating the spliced innerliner film.

FIG. 3 is an enlarged cross sectional view taken along lines A-A of FIG. 2 to further illustrate the splice of the circumferential innerliner film (4) comprised of with its inner end portion (4B) and outer end portion (4A) overlapping each other in region (6A) with a first rubber strip (5B) therebetween. The tire rubber carcass layer (3) is illustrated as being built over the innerliner film (4) without a carcass splice at the location of the innerliner film splice. The innerliner film splice also includes a second rubber strip (5A) adhered to the inner end portion of the innerliner film (4A) and abridging the innerliner film (4A) and the rubber strip (5B) to therefore adhere to the rubber strip (5B). In practice, for the preparation of the spliced innerliner film (4) in a form of a sheet is wrapped in a circumferential direction around a tire building drum (17) which contains a release coating (not shown) to enable a release of the built tire containing the spliced innerliner film (4) to include the second rubber strip (5A) adjacent to the surface of the building drum (17).

Figure 3A:
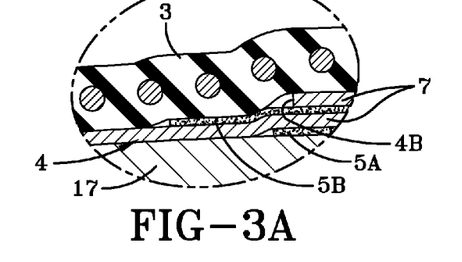
FIG. 3A is an enlarged cross sectional view taken from a portion of FIG. 3.

FIG. 3A is an enlarged cross sectional view taken from a portion of FIG. 3, namely the portion identified as (3A), with the overlapping inner end portion (4B) and outer end portion (4A) of innerliner film (4) with the first rubber strip (5B) therebetween and the underlying second rubber strip (5A).

In particular, the first rubber strip (5B) is shown as extending in a circumferential direction beyond the inner end portion (4B) of the innerliner film (4) to thereby aid in promoting bonding of the innerliner film (4) to the tire carcass ply (3).

Figure 3B:
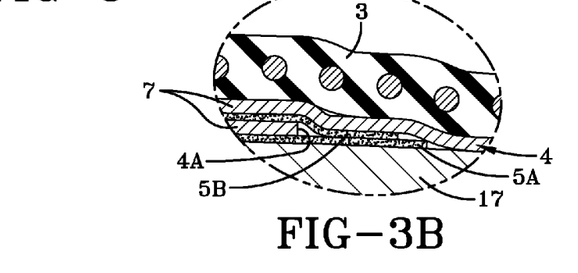
FIG. 3B is an enlarged cross sectional view taken from a portion of FIG. 3.

FIG. 3B is an enlarged cross sectional view taken from a portion of FIG. 3, namely the portion identified as (3B), with the outer end portion (4A) and innerliner film (4) with the first rubber strip (5B) therebetween and the underlying second rubber strip (5A).

In particular, both the first rubber strip (5B) and second rubber strip (5A) are shown as extending in a circumferential direction beyond the inner end portion (4A) of the innerliner film (4) to thereby aid in promoting bonding of inner end portion (4A) the innerliner film (4).

Figure 4:
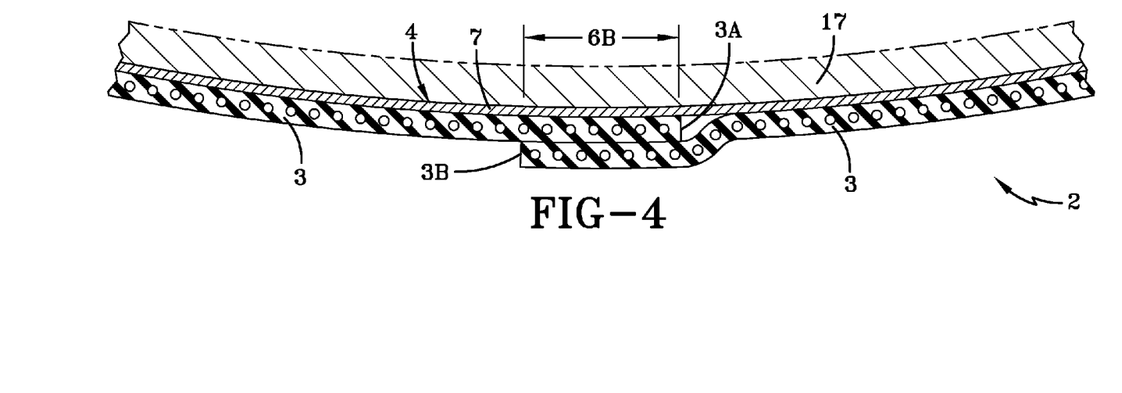
FIG. 4 is provided to show end portions of a carcass overlapped in a region spaced apart from the innerliner film splice, all of which is presented as being over a building drum.

FIG. 4 is provided to simply show the end portions (3A) and (3B) of the carcass ply (3) overlapping and stitched (pressed) together in region (6B) over a non-spliced portion of the innerliner film (4), all over the building drum (17) and therefore spaced apart from the innerliner film splice.

Figures 5A, 5B, 5C:
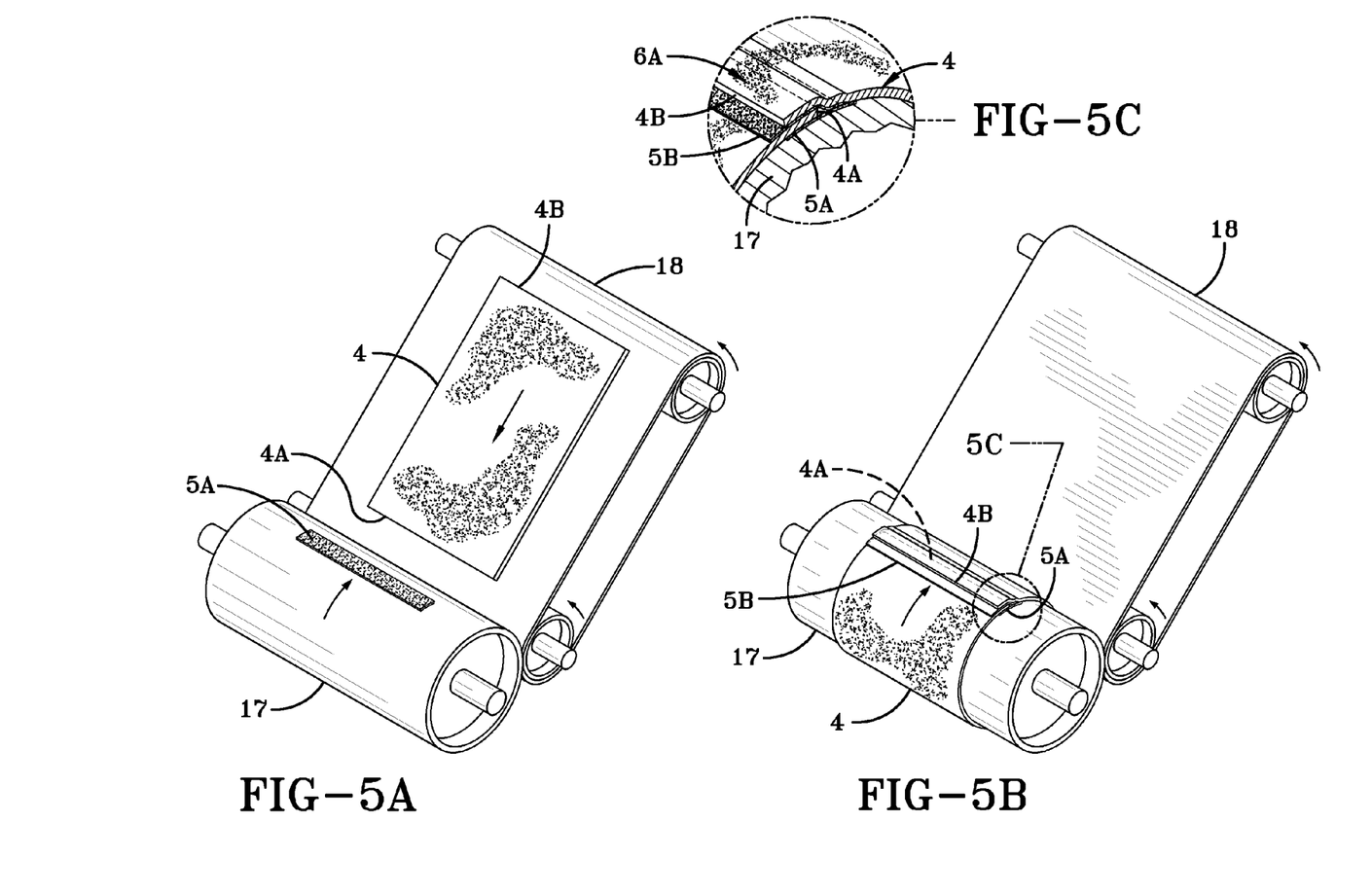
FIG. 5A illustrates an initial step of preparation of an innerliner which includes positioning a first rubber strip on a building drum to which an end portion of the innerliner sheet is adhered.
FIG. 5B illustrates application of a second rubber strip over an end portion of the innerliner sheet on the building drum with the second rubber strip between the end portions of the innerliner sheet to form a splice.
FIG. 5C is an enlarged view of an end portion of FIG. 5B showing the splice.

FIG. 5A illustrates an initial step of preparation of an innerliner comprised of feeding a sheet of innerliner film (4) which is fed to a tire building drum (17) from a conveyor belt (18). A second rubber strip (5A) is applied to the building drum (17) after which the sheet of innerliner film (4) is wrapped in a circumferential direction around the building drum (17) to adhere its end portion (4A) to the second rubber strip (5A).

FIG. 5B illustrates a first rubber strip (5B) applied over the opposite side of end section (4A) of the innerliner strip (4) from the second rubber strip (5A) over which is applied the end portion (4B) of the innerliner film (4) to thereby create a splice composed of the end portions (4A) and (4B) of the innerliner film (4) with the first rubber strip (5B) therebetween.

FIG. 5C is an enlarged view of an end portion of FIG. 5B illustrating the splice composed of the overlapping end portions (4A) and (4B) of the innerliner film (4) with the first rubber strip (5B) therebetween together with the second rubber strip (5A) releasably positioned on the release coated building drum (17) to fasten (bond) the associated end portion (4A) of the innerliner film.

Figures 6A, 6B, 6C:
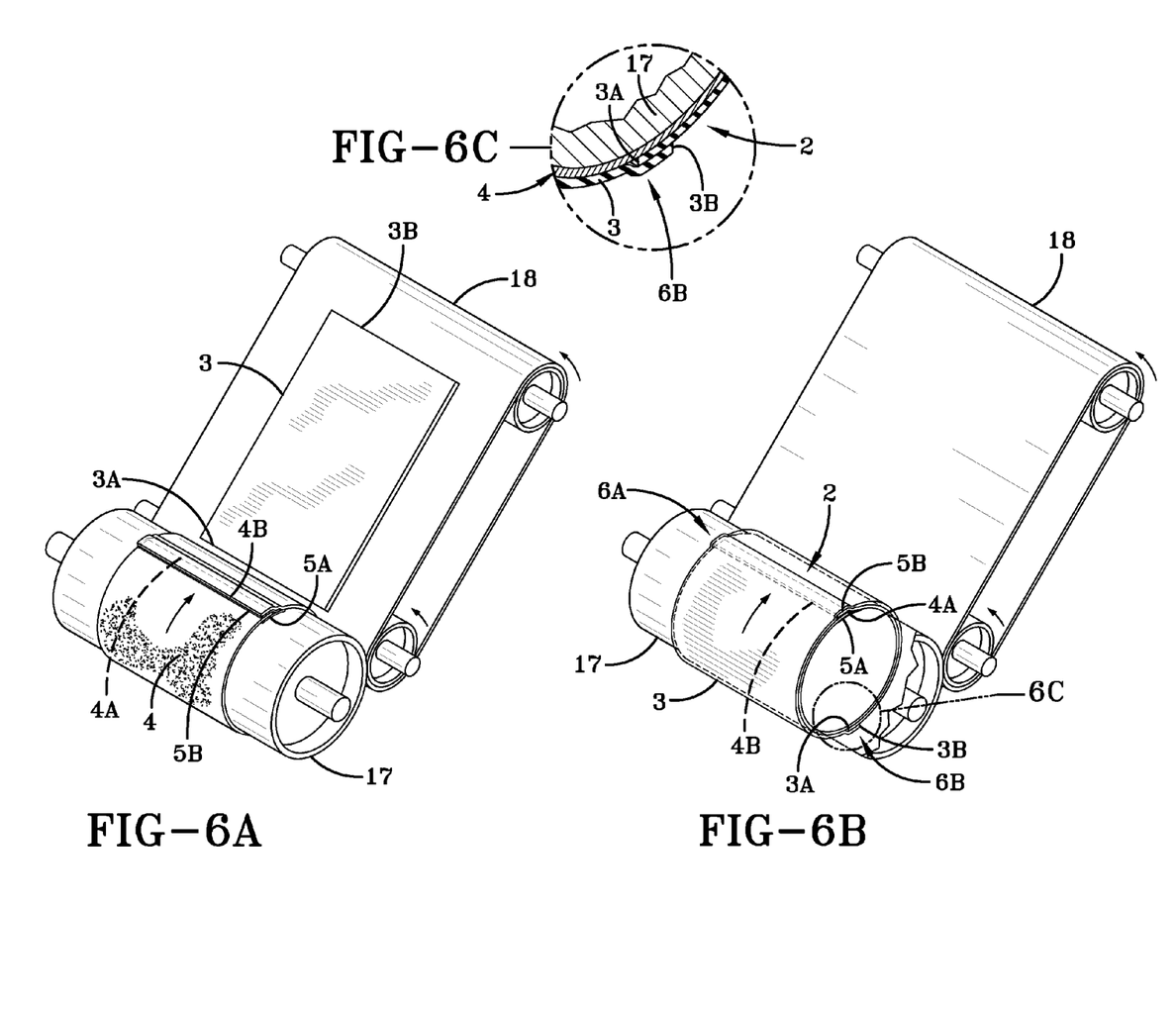
FIG. 6A is provided to illustrate building of the cord reinforced rubber carcass ply on the building drum over the spliced innerliner film.
FIG. 6B is provided, together FIG. 6A to illustrate overlapped carcass ply portions to form a splice which is spaced apart from the innerliner film splice.
FIG. 6C is an expanded view of the region 6B of FIG. 6B showing the carcass ply splice as being spaced apart from the innerliner film splice.

FIG. 6A is provided to illustrate building of the cord reinforced rubber carcass ply (3) as it being fed from a conveyor belt (18) onto a building drum (17) and wrapped in a circumferential direction around and over spliced innerliner film (4) with its overlaying end portions (4A) and (4B) and associated second and first rubber strips (5A) and (5B) on the building drum (17).

In FIG. 6B, taken with FIG. 6A, the carcass end portions (3A) and (3B) of the carcass ply (3) are shown as being overlapped and stitched (pressed) together to from a splice which is spaced apart from, and therefore at a different location than, the splice of the innerliner film (4).

FIG. 6C is an expanded view of region 6B of FIG. 6B showing the carcass ply splice comprised of overlapped carcass end portions (3A) and (3B) of the carcass ply (3) with the carcass ply splice positioned over the innerliner film which is spaced apart from the innerliner splice.

In one embodiment, both sides of the thin innerliner film (4) contain an RFL coating (not shown) to promote bonding (e.g. cohesive bonding building tack until the tire is cured) of the innerliner film (4) to the adjoining tire rubber carcass ply (6) and to promote bonding (e.g. cohesive bonding building tack until the tire is cured) of the components of the innerliner film splice (e.g. the innerliner film end segments (4A) and (4B) and rubber strips (5A) and (5B)).

The innerliner film (4) for this drawing (Figures) is comprised of about 60 weight percent of a thermoplastic polyamide-based polymer as a copolymer of diamine and dicarboxylic acid, namely at least one of nylon 6 (a caprolactam) and nylon 6-6 (copolymer of hexamethyl and adipic acid, and about 40 weight percent of a dispersion therein comprised of copolymers comprised of a polyamide-based segment and a polyether-based segment.

The RFL adhesive coating (not shown) for this drawing (Figures) is comprised of a resorcinol-formaldehyde resin/styrene-butadiene vinylpyridine latex optionally containing a styrene-butadiene rubber latex and/or blocked isocyanate, wherein the first and second rubber strips, or layers, (5A) and (5B) are rubber strips comprised of at least one sulfur curable diene-based elastomer.

In additional accordance with the invention, the tire is further provided as a cured tire having been cured in a suitable mold at an elevated temperature.

The thin polymeric innerliner film (4) for the barrier layer may have a film thickness, for example, of from about 25 to about 200 microns. Alternately the thickness of the thin film may range from about 50 microns to about 150 microns.

The aforesaid thin innerliner film for the barrier layer may have an oxygen permeability, for example, of less than $20 \times 10^{-12}$ cc-cm/cm$^2$·sec·cmHg. Desirably, the aforesaid polymeric innerliner film may have an elongation, for example, of at least about 200 percent at about 23° C. As such, it is intended that, when used as the innerliner layer of the tire, the polymeric film is not intended to break during the tire shaping process.

The rubber compositions for the rubber tire carcass layer (ply) and the rubber layer first and second rubber strips can contain conventional rubber tire additives to provide a desired rubber property as would be applied by one having skill in the appropriate art. Such known and commonly used additive materials may include, for example, sulfur cure activators, retarders and accelerators, rubber processing oils, resins including tackifying resins, plasticizers, fatty acids, zinc oxide, waxes, antidegradant, antiozonants and peptizing agents.

The uncured tire assembly can be molded and sulfur cured in a suitable tire mold at an elevated temperature and pressure conditions as would be appreciated and known to those having skill in such art.

It is concluded that application of the uncured, sulfur curable, first and second rubber strips provide significant reinforcement of the splice to respond to stress caused by expansion of the uncured tire during its building.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A pneumatic tire is provided having an innerliner comprised of an innerliner film having an inner surface covering the tire carcass's inner surface in a circumferential direction and having an outer surface adjacent to an internal air cavity of said tire;

wherein the innerliner film has its two end portions overlapping each other to form a splice comprised of an inner first end portion adjacent to the tire rubber carcass and an outer second end portion adjacent to the internal air cavity of the pneumatic tire;

wherein said innerliner film splice is comprised of:

(A) the overlapping inner first and outer second end portions of said innerliner film bonded through a first rubber strip positioned therebetween, wherein said first rubber strip extends in a circumferential direction beyond said splice on the inner surface of the innerliner film to further bond a combination of a surface of said inner end portion of the innerliner film, said inner surface of the innerliner film and said tire rubber carcass, and (B) a second rubber strip abridging and bonded to a surface of said outer second end portion of the innerliner film and outer surface of said innerliner film adjacent to the internal air cavity of said pneumatic tire;

wherein said innerliner film is comprised of from about 40 to about 85 weight percent of a thermoplastic polyamide-based polymer, which is comprised of a copolymer of a diamine and dicarboxylic acid comprising a copolymer of hexamethylenediame and adipic acid (nylon 6-6) and from about 15 to about 60 weight percent of dispersed domains therein comprised of at least one of:

(1) copolymer or mixture comprised of a polyamide-based segment and a polyether-based segment, and (2) polymer comprised of at least one of polyalkylene glycol, polyoxyalkylene diamine and copolymers thereof;

wherein said first and second rubber strips are comprised of at least one sulfur curable diene-based elastomer where said elastomer is comprised of at least one of polymer of at least one of isoprene and 1,3-butadiene and of styrene and polymer of at least one of isoprene and 1,3-butadiene, wherein said elastomer is exclusive of a copolymer of isobutylene and diene hydrocarbon;

wherein a location of the innerliner film splice is spaced apart from any tire rubber carcass ply splice; and wherein said innerliner film is coated on both of its sides with an RFL adhesive comprised of a resorcinol-formaldehyde resin/styrene-butadiene vinylpyridine latex.

2. The tire of claim 1 wherein tire rubber carcass is comprised of a sulfur curable diene-based elastomer comprised of at least one polymer of at least one of isoprene and of 1,3-butadiene and of styrene with at least one of isoprene and 1,3-butadiene, exclusive of a copolymer of isobutylene and diene hydrocarbon.

3. The tire of claim 1 wherein said copolymer of diamine and dicarboxylic acid of said innerliner film is at least one of nylon 6, nylon 6-6, nylon 4,6, nylon 11, nylon 12, nylon 6,10 and nylon 6,12.

* * * * *